(No Model.) 2 Sheets—Sheet 1.
T. DARK.
SYSTEM FOR COLLECTING, SEPARATING, AND DISINFECTING SEWAGE AND DRAINAGE.
No. 363,810. Patented May 31, 1887.
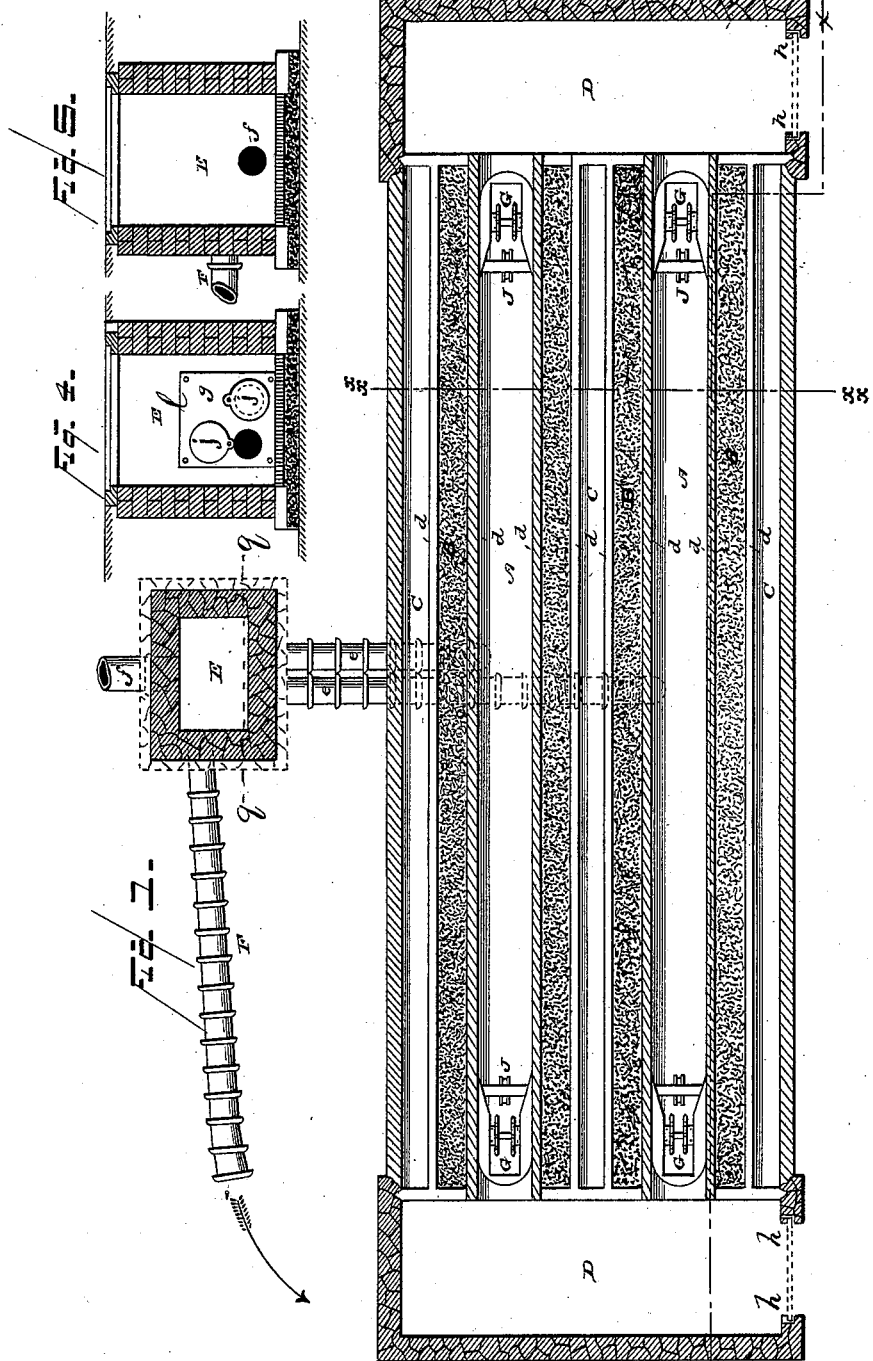

(No Model.) 2 Sheets—Sheet 2.
T. DARK.
SYSTEM FOR COLLECTING, SEPARATING, AND DISINFECTING SEWAGE AND DRAINAGE.
No. 363,810. Patented May 31, 1887.
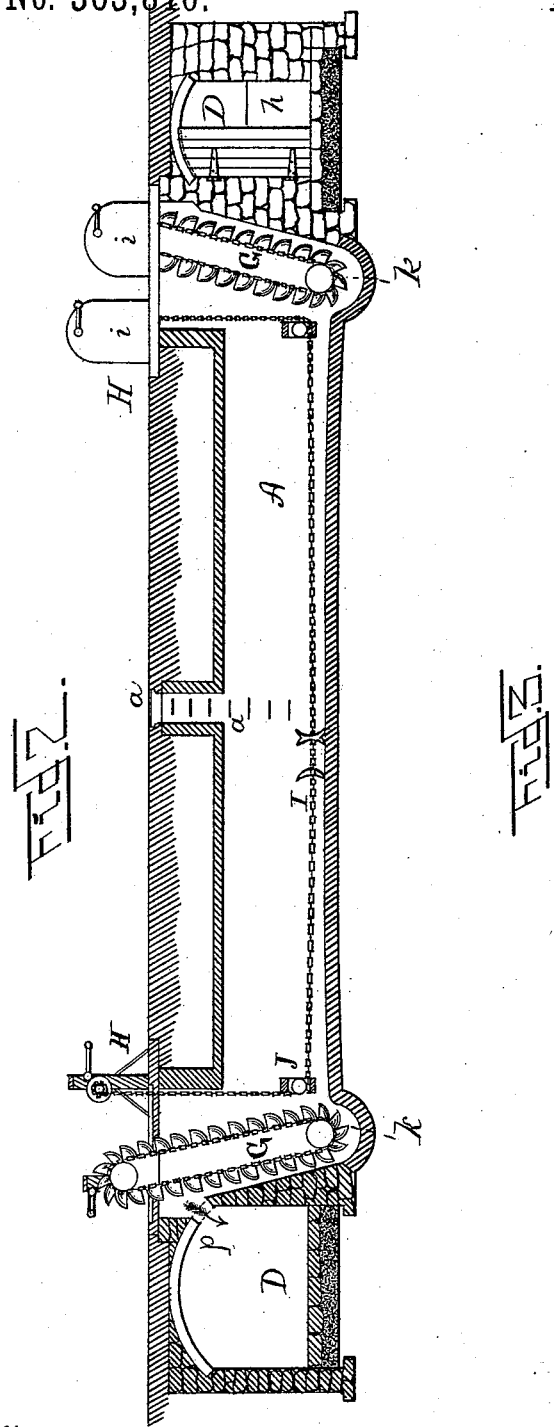
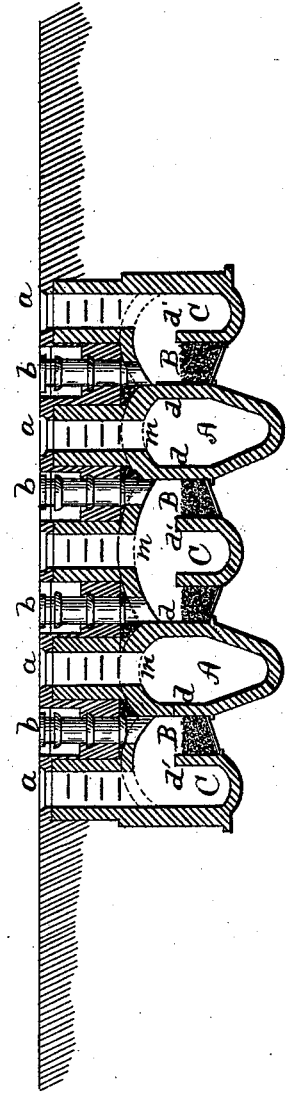

UNITED STATES PATENT OFFICE.

THOMAS DARK, OF BUFFALO, NEW YORK.

SYSTEM FOR COLLECTING, SEPARATING, AND DISINFECTING SEWAGE AND DRAINAGE.

SPECIFICATION forming part of Letters Patent No. 363,810, dated May 31, 1887.

Application filed November 11, 1886. Serial No. 218,545. (No model.)

*To all whom it may concern:*

Be it known that I, THOMAS DARK, a citizen of the United States, residing at Buffalo, in the county of Erie and State of New York, have invented certain new and useful Improvements in a System for Collecting, Separating, and Disinfecting Sewage and Drainage; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention is for the purpose of collecting, disinfecting, and utilizing the drainage or sewage of cities, towns, public institutions, &c., the same comprising a series or system of sludge tanks and reservoirs, filter-beds, cleaning-out and elevating devices, drains, &c., confined only in extent to the requirements of the city, town, institution, or place; and the invention as constructed and applied will be understood by reference to the following specification and claims.

In the drawings, Figure 1 is a ground plan, showing the sludge-reservoirs, filter-beds, drains, &c; Fig. 2, a longitudinal sectional elevation of sludge-reservoirs through line $x$, Fig. 1; Fig. 3, a cross-section through line $x\,x$ of Fig. 1, showing the reservoirs, filter-beds, and drains; Fig. 4, a vertical cross-section through line $q\,q$ of receiving-tank, Fig. 1, showing opening to sewers; and Fig. 5, an elevation of end of a receiving-tank.

A A represent long sludge-reservoirs, built of brick, &c., the bottoms narrower than above, and falling each way from the center to a pit, $k$, at each end, in which works an elevator, G. (See Fig. 2.)

B B represent filter-beds, made by leaving a space between the side walls, $d\,d$, built of porous brick, and porous walls $d'\,d'$ of a series of drains, C C C, which carry off the water that filters from the sludge in reservoirs A A through walls $d\,d'$, the spaces or beds B B B filled in with pebbles, sand, or any filtering material, the same being put in and renewed through a series of vertical pipes, $b\,b\,b$, about twenty feet apart, (see Fig. 3,) opening into the filter-beds from the surface, and having proper covers.

$a\,a\,a$, Figs. 2 and 3, represent a series of man-holes leading into the reservoirs, &c., from the surface and through the arches $m\,m$.

Across the two ends of reservoirs A A is built a fertilizing-tank, D, to receive the sludge, &c., raised by the elevators G G from the reservoirs and dropped by their buckets into the tanks through openings $p$. (See Fig. 2.) Here the mass is mixed in with lime, &c., thoroughly dried and deodorized, and then removed through gates and bulk-heads $h\,h$ (see Figs. 2 and 1) and sold as a fertilizer.

E is a receiving-tank, built at one side of the main works, (see Fig. 1,) into which the main sewer $f$ leads. (See Figs. 5 and 1.) From this sewers $e\,e$ run into the sludge-reservoirs, two or more, or as many as there are, so that when one is filled it is shut off by valves $j$ at the iron plate $l$ across the end of sewer-openings in the tank E (see Fig. 4) and the other valve $j$ opened, which allows the stuff to drain off into the next reservoir, &c.

F is an overflow sewer-pipe leading from the receiving-tank to the main sewer, and into which all the drains C C C converge. (Main sewer not shown.) The object of this pipe F is merely to carry away the surplus water in case of flood or more water coming into said tank E than can pass through the filters.

H I J represent the devices for cleaning out the sediment in the reservoirs, for which I have a patent. The scraper I when not in use is hung up in one of the man-holes $a$, so as not to get fast in the sediment in the bottom.

The operation of this system is as follows: The sludge goes into the receiving-tank E through the main sewer, and thence through sewers $e\,e$ to the receiving-reservoirs A A. When these are filled, to prevent overflow the surplus is carried off through the overflow-pipe F into main sewer. The reservoirs being full, the water in them filters through the porous side walls, $d\,d\,d'\,d'$, into the drains C C, and from them runs into the main sewer, and is thus carried off. The sludge remaining in the reservoirs A A is now operated on by my plows and scrapers I, connected to a chain running over sheaves J J up to the windlasses H H. These devices work both ways and scrape the sludge into pits $k\,k$, and is from there elevated and dumped into the fertilizing-tanks D at each end. Here lime, &c., is mixed with it and left to dry. Then the bulk-heads $h$ are removed and wagons backed in and the fertilizer taken away and sold, thus making a revenue from matter that is otherwise a nuisance and deleterious to health.

The top of the whole device is covered, so that no effluvia escapes, and the windlass and elevators will also be covered with galvanized iron.

I claim—

1. In a system for collecting and disinfecting sewage, the combination, with a main sewer and a receiving-tank, of a series of sludge-reservoirs, A A, having porous side walls, $dd$, drains C C, having porous side walls, $d'$ $d'$, the filtering-spaces B B between the porous walls $d'$ $d'$ of drains C C and porous walls $d$ $d$ of reservoirs A A, filled with filtering material, and the fertilizing and disinfecting tank or tanks D at each end and in connection with said reservoirs, all arranged and operating substantially as and for the purpose specified.

2. In a system for collecting and disinfecting sewage, the combination of the sludge-reservoirs A A, drains C C, both having porous side walls, the bottoms of said reservoirs A slanting from the center to pits $k$ $k$, the elevators G G, cleaning devices H I J, fertilizing-tanks D D, and the openings $p$ thereto from said reservoirs, all substantially as and for the purpose specified.

In testimony whereof I affix my signature in presence of two witnesses.

THOMAS DARK.

Witnesses:
J. R. DRAKE,
HENRY HEITMUELLER.